Patented May 11, 1948

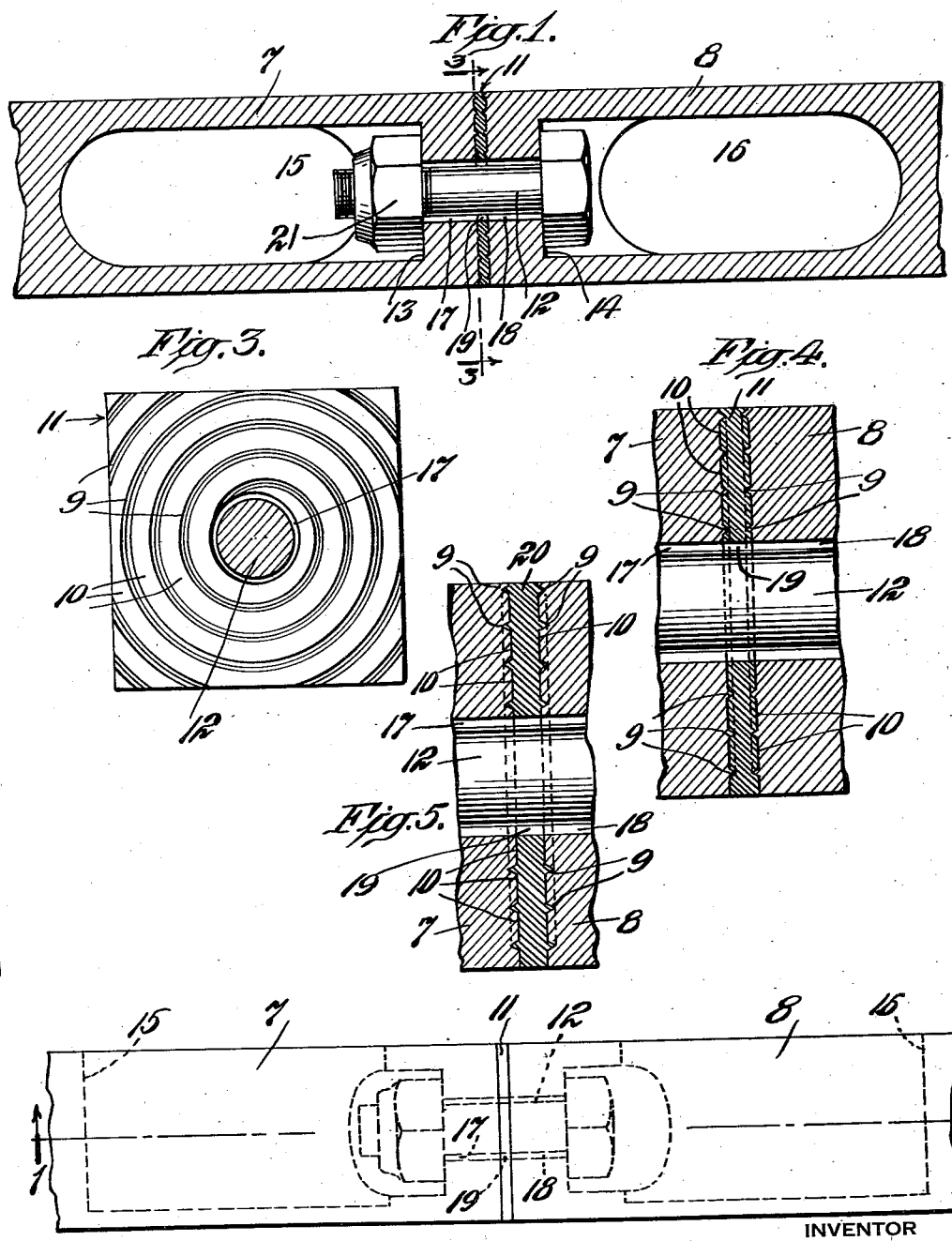

2,441,188

UNITED STATES PATENT OFFICE 2,441,188

TENSION BOLT JOINT

Harold W. Earhart, Wichita, Kans., assignor to Beech Aircraft Corporation, Wichita, Kans., a corporation of Delaware Application June 8, 1945, Serial No. 598,219

6 Claims. (Cl. 287—127)

The invention here disclosed relates to what are known as tension bolt joints, in which the bolts holding the members joined together carry any tension loads to be transmitted through the joints.

In ordinary joints of this character the bolt also is forced to carry transverse loads through shear in the bolt. Such joints require close tolerance fits between mating components, that is, between the fittings and the bolt and between the faces of the fittings to transmit transverse loads from one fitting into the bolt and from the bolt into the other fitting and compression loads from the face of one fitting to the face of the other.

These fittings are expensive due to the precision machining required to effect the necessarily close fits and because of the precise tooling needed to hold the close tolerances on the structural components.

Also, such joints are difficult to inspect to see that the proper amount of bearing is provided for transmission of compression and transverse loads. The precise fit required many times makes these joints difficult to assemble and to take apart.

Objects of the present invention are to avoid and eliminate objections and limitations such as mentioned, existing in present day forms of tension bolt joints.

More particularly it is a purpose of the invention to provide joining means efficiently transmitting both transverse and axial loads at the same time and through a combination of shear fastener and tension fastener arranged each to carry its proportion of design load at a strength-weight ratio providing a desired factor of safety.

Further objects of the invention are to attain simplicity and low cost in the fabrication of the mating parts and to accomplish full interchangeability of parts.

Other important objects are to provide a fastener of the type indicated particularly suited to the designing and building of aircraft.

Other desirable objects and the novel features by which all purposes of the invention are attained are set forth or will appear in the course of the following specification.

The drawing accompanying and forming part of the specification illustrates certain present embodiments of the invention. Structure, however, may be modified and changed as regards the immediate disclosure, all within the true intent and broad scope of the invention as hereinafter defined and claimed.

Fig. 1 in the drawing is a broken longitudinal sectional view of an embodiment of the joint appearing as on substantially the plane of line 1—1 of Fig. 2;

Fig. 2 is a broken side elevation of the joint;

Fig. 3 is an enlarged cross sectional view as on substantially the plane of line 3—3 of Fig. 1;

Fig. 4 is a further enlarged broken sectional detail.

Fig. 5 is a broken sectional detail of a modified form of the invention.

In the drawing the fittings which are joined together and which may be two end-to-end sections of a beam, strut or other structural element, are designated 7 and 8. These are finished off with abrupt end faces of substantially the full cross sectional area of the pieces, but such faces instead of being smooth or machined with interfitting parts as in prior tension bolt structures, are provided, in the form of the invention shown in Figs. 1 to 4, with relatively sharp projections or serrations 9 and intervening flat areas or lands 10.

Specifically the serrations and intervening lands are shown provided by a sharp edged ridge extending in spiral convolutions across the end of each member.

The purpose of these projections and lands is to effect an automatic interlock for carrying the shear loads and full engagement for carrying compression loads across the joint.

These results are attained by the interposition of a layer 11 of softer material than the faces of the fittings but of a shear strength sufficient to transmit the transverse loads without impairment.

Forming a part of this combination is the tension bolt 12, designed and arranged to carry all tension loads, but free of transverse, shear load.

This bolt is shown as bearing at opposite ends on seats or shoulders 13, 14, provided in recesses 15, 16, in the opposing end portions of the fittings and as extending, in the clear, through registering oversize openings 17, 18 and 19, in the fittings and interposed connecting layer.

When the bolt is tightened to approximately its yield stress, the serrations will be impressed into the washer-like connecting layer or spacer of relatively softer material and this material will be forced into full contact with the flat areas between the serrations. This intervening layer is thus made fully capable of carrying both shear and compression loads. The pressure applied in forcing the connecting material into fully seated engagement on the flats serves to confine such material between the ridges, building up the shear strength in that way.

The shear load interlock between the joint members and intervening connector may be provided by reversing the relation shown, that is, by forming grooves or indentations in the ends of the fittings, instead of projecting ridges or serrations. For some purposes the end faces may be knurled or otherwise machined to accomplish the formation of relatively sharp points, a relatively sharp edge or a series of edges, curved or straight, with intervening flat areas or reliefs.

In all forms the transverse loads are transmitted from the face of one fitting through what are termed the serrations, into the connecting washer and from the washer through the serrations into the other fitting. All compression loads are taken directly through the washer or spacer.

In some circumstances it may be more practical to put the serrations and lands on the washer member and make that member of harder material than the opposing faces of the fittings. This alternative is illustrated in Fig. 5 where the washer element is indicated at 20, of harder material than the end faces of the fittings and as having serrations 9 and intervening lands 10 at opposite sides impressed in and cooperating with the opposing ends of the fittings.

As another illustration the serrations or other elements for forming the shear load impressions in the impression material may be on separately formed pieces attached either to the faces of the fittings or to the faces of the washer or wafer, as by riveting, welding, bolting or the like.

Instead of a single bolt and washer the joint may be made up of a plurality of bolts and washers, according to design requirements.

The spiral or scroll form of serration can be inexpensively produced and has many other advantages. To provide further interlock it may be interrupted or otherwise varied in configuration. The extent of projection of the ridges, points, spurs or teeth may be relatively slight as compared with the total thickness of the wafer, usually less than half the thickness of the material, so as to avoid possibility of complete penetration in the event of alignment of edges or points at opposite faces of the material.

The seats for the bolt heads are located far enough back from the end faces for development of the full tensile strength of the members and, if desired, load carrying washers may be disposed beneath the heads and nuts of the bolts.

The seating of the tension bolts in cavities within the confines or outlines of the connected members and at the center of the opposing areas provides balance and otherwise adapts the invention particularly to design and structural problems in aircraft.

The joint is arranged to carry the full tension, compression and shear loads which the parts are capable of carrying, and practically without adding any weight. These joints can be quickly made up and, with the use of lock nuts or equivalent such as indicated at 21, Fig. 1, will hold under the tension to which they have been set up until purposely released. When released the parts can be immediately separated. Reassembling is just as easy because of there being no need to match closely fitting parts.

The tightening of the joint automatically interlocks the impression material in the shear load sustaining condition and in such operation tends to correct or compensate for any slight misalignment which may have existed in the bringing of the parts together into their abutting relation.

The tension fastener and shear fastener portions of the connection carry their full proportions of the design load with the desired factor of safety and by their arrangement enable complete and full inspection.

What is claimed is:

1. A tension bolt joint comprising members having opposed abutment faces, a layer of shear load carrying material between said opposed abutment faces, said members having bolt seats in back of said abutment faces and registering oversize bolt passages extending between said seats, a bolt having a head bearing on one seat and a nut bearing on the other seat, the grip portion of the bolt between said head and nut extending free of engagement through said bolt passage, said intermediate shear load carrying layer and the opposing abutment faces at opposite sides of the same varying in surface contour and having a hardness differential whereby under the tension of the bolt, portions on the harder surfaces create counterpart interlocking impressions in the softer material.

2. A tension bolt joint comprising members having opposed abutment faces, a layer of shear load carrying material between said opposed abutment faces, said members having bolt seats in back of said abutment faces and registering oversize bolt passages extending between said seats, a bolt having a head bearing on one seat and a nut bearing on the other seat, the grip portion of the bolt between said head and nut extending free of engagement through said bolt passage, said intermediate shear load carrying layer and the opposing abutment faces at opposite sides of the same varying in surface contour and having a hardness differential whereby under the tension of the bolt, portions on the harder surfaces create counterpart interlocking impressions in the softer material, said layer being the harder structure and having the impression forming portions on opposite faces of the same interlocking in the softer abutment faces of the joined members.

3. A tension bolt joint comprising members having opposed abutment faces, a layer of shear load carrying material between said opposed abutment faces, said members having bolt seats in back of said abutment faces and registering oversize bolt passages extending between said seats, a bolt having a head bearing on one seat and a nut bearing on the other seat, the grip portion of the bolt between said head and nut extending free of engagement through said bolt passage, said intermediate shear load carrying layer and the opposing abutment faces at opposite sides of the same varying in surface contour and having a hardness differential whereby under the tension of the bolt, portions on the harder surfaces create counterpart interlocking impressions in the softer material, the interposed layer being the softer material and the impression forming portions being carried by the abutment faces of the joined members.

4. A tension bolt joint comprising members having opposed abutment faces, a layer of shear load carrying material between said opposed abutment faces, said members having bolt seats in back of said abutment faces and registering oversize bolt passages extending between said seats, a bolt having a head bearing on one seat and a nut bearing on the other seat, the grip portion of the bolt between said head and nut extending free of engagement through said bolt passage, said intermediate shear load carrying layer and the opposing abutment faces at opposite sides of the same varying in surface contour and having a hardness differential whereby under the tension of the bolt, portions on the harder surfaces create counterpart interlocking impressions in the softer material, the interposed layer being of softer material than the end faces of the joined members and the interlock forming portions being shallow, sharp edged ridges on the end faces of the members.

5. A tension bolt joint comprising members having opposed abutment faces, a layer of shear load carrying material between said opposed abutment faces, said members having bolt seats in back of said abutment faces and registering oversize bolt passages extending between said seats, a bolt having a head bearing on one seat and a nut bearing on the other seat, the grip portion of the bolt between said head and nut extending free of engagement through said bolt passages, said intermediate shear load carrying layer and the opposing abutment faces at opposite sides of the same varying in surface contour and having a hardness differential whereby under the tension of the bolt, portions on the harder surfaces create counterpart interlocking impressions in the softer material, said impression forming portions comprising spaced, projecting, shallow, sharp edged ridges.

6. A tension bolt joint comprising members having opposed abutment faces, a layer of shear load carrying material between said opposed abutment faces, said members having bolt seats in back of said abutment faces and registering oversize bolt passages extending between said seats, a bolt having a head bearing on one seat and a nut bearing on the other seat, the grip portion of the bolt between said head and nut extending free of engagement through said bolt passages, said intermediate shear load carrying layer and the opposing abutment faces at opposite sides of the same varying in surface contour and having a hardness differential whereby under the tension of the bolt, portions on the harder surfaces create counterpart interlocking impressions in the softer material, said impression forming portions being in the form of ridges extending spirally about the axis of said bolt.

HAROLD W. EARHART.

REFERENCES CITED

The following references are of record in the file of this patent:

UNITED STATES PATENTS

| Number | Name | Date |
|---|---|---|
| 1,567,813 | Oleson | Dec. 29, 1925 |
| 1,834,581 | Ferrell et al. | Dec. 1, 1931 |
| 2,206,223 | Dearborn | July 2, 1940 |